United States Patent
Onohara et al.

(10) Patent No.: US 10,282,316 B2
(45) Date of Patent: May 7, 2019

(54) INFORMATION-SHARING DEVICE, METHOD, AND TERMINAL DEVICE FOR SHARING APPLICATION INFORMATION

(71) Applicant: SONY CORPORATION, Minato-ku (JP)

(72) Inventors: Takashi Onohara, Tokyo (JP); Roka Ueda, Tokyo (JP); Keishi Daini, Kanagawa (JP); Taichi Yoshio, Kanagawa (JP); Yuji Kawabe, Tokyo (JP); Seizi Iwayagano, Chiba (JP); Takuma Higo, Tokyo (JP); Eri Sakai, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/357,881

(22) PCT Filed: Nov. 12, 2012

(86) PCT No.: PCT/JP2012/079878
§ 371 (c)(1),
(2) Date: May 13, 2014

(87) PCT Pub. No.: WO2013/094353
PCT Pub. Date: Jun. 27, 2013

(65) Prior Publication Data
US 2014/0304431 A1    Oct. 9, 2014

(30) Foreign Application Priority Data

Dec. 22, 2011    (JP) .................................. 2011-281431

(51) Int. Cl.
*G06F 13/12*    (2006.01)
*H04M 1/725*    (2006.01)
(Continued)

(52) U.S. Cl.
CPC ...... *G06F 13/122* (2013.01); *H04M 1/72533* (2013.01); *H04W 4/40* (2018.02);
(Continued)

(58) Field of Classification Search
None
See application file for complete search history.

(56) References Cited

U.S. PATENT DOCUMENTS

2002/0174270 A1* 11/2002 Stecyk ................ H04L 12/2805
710/1
2004/0024890 A1*  2/2004 Baek et al. .................... 709/229
(Continued)

FOREIGN PATENT DOCUMENTS

EP    1746518 A1    1/2007
JP    9-62630        3/1997
(Continued)

OTHER PUBLICATIONS

International Search Report dated Feb. 5, 2013 in PCT/JP2012/079878.

(Continued)

*Primary Examiner* — Idriss N Alrobaye
*Assistant Examiner* — Dayton Lewis-Taylor
(74) *Attorney, Agent, or Firm* — Wolf, Greenfield & Sacks, P.C.

(57) ABSTRACT

There is provided an information-sharing device including, in a second device connected to a first device, an information obtaining unit which obtains, through a communication unit of the second device, first application information indicating an application possessed by the first device, a shared information generating unit which generates shared information shared by the first device and the second device, based on the first application information obtained by the information obtaining unit, and a transmission control unit which transmits the shared information through the communication unit to the first device.

11 Claims, 9 Drawing Sheets

(51) Int. Cl.
*H04W 4/44* (2018.01)
*H04W 4/40* (2018.01)
*H04M 1/60* (2006.01)

(52) U.S. Cl.
CPC ............ *H04W 4/44* (2018.02); *H04M 1/6091* (2013.01); *H04M 2250/02* (2013.01); *H04R 2499/13* (2013.01)

(56) References Cited

U.S. PATENT DOCUMENTS

| | | |
|---|---|---|
| 2007/0039025 A1 | 2/2007 | Kraft et al. |
| 2007/0136446 A1* | 6/2007 | Rezvani ............ G06F 17/30749 709/219 |
| 2007/0213041 A1* | 9/2007 | Horie .................. G06F 3/04817 455/419 |
| 2009/0075624 A1 | 3/2009 | Cox et al. |
| 2009/0157198 A1 | 6/2009 | Morikawa |
| 2011/0254863 A1 | 10/2011 | Hoshino |
| 2011/0265003 A1 | 10/2011 | Schubert et al. |
| 2011/0275358 A1 | 11/2011 | Faenger |
| 2012/0088548 A1* | 4/2012 | Yun et al. ...................... 455/557 |
| 2012/0159472 A1* | 6/2012 | Hong et al. ................... 717/178 |

FOREIGN PATENT DOCUMENTS

| | | |
|---|---|---|
| JP | 2000-099233 A | 4/2000 |
| JP | 2002-229940 | 8/2002 |
| JP | 2009-146146 | 7/2009 |
| JP | 2009-205492 A | 9/2009 |
| JP | 2010-199718 | 9/2010 |
| JP | 2011-254299 A | 12/2011 |

OTHER PUBLICATIONS

International Search Report and Written Opinion and English translation thereof dated Feb. 5, 2013 in connection with International Application No. PCT/JP2012/079878.

International Preliminary Report on Patentability and English translation thereof dated Jul. 3, 2014 in connection with International Application No. PCT/JP2012/079878.

Extended European Search Report dated Nov. 22, 2018 in connection with European Application No. 18184183.4.

* cited by examiner

FIG. 2
| 1 | TUNER |  |
|---|---|---|
| 2 | USB |  |
| 3 | MUSIC |  |
| 4 | INTERNET RADIO |  |
| 5 | NAVI |  |
| 6 | MAP |  |
| 7 | MEDIA |  |

INFORMATION-SHARING DEVICE, METHOD, AND TERMINAL DEVICE FOR SHARING APPLICATION INFORMATION

TECHNICAL FIELD

The present technology relates to information-sharing devices, information-sharing methods, information-sharing programs, and terminal devices which allow a plurality of devices to share information.

BACKGROUND ART

Mobile terminal devices such as mobile telephones, smart phones, etc. which have a wide variety of applications for providing various services and functions have in recent years become widespread. And, in order to enhance the convenience by applications, there has been a demand for a linkage between the mobile terminal devices and other devices. Therefore, an in-vehicle device and a communication control method have been proposed which allow the in-vehicle device to use a service and a function by execution of an application in a mobile terminal device, by means of the linkage (Patent Literature 1).

CITATION LIST

Patent Literature

Patent Literature 1: JP 2010-199718A

SUMMARY OF INVENTION

Technical Problem

However, in the technique described in Patent Literature 1, for example, a display of an operation of selecting an application on the mobile terminal device is not linked with that on the in-vehicle device, and therefore, it is necessary to operate the mobile terminal device and the in-vehicle device separately for use of an application.

The present technology has been made in view of the above point. It is an object of the present technology to provide an information-sharing device, an information-sharing method, an information-sharing program, and a terminal device which allow a plurality of devices to share information about an application possessed by each device, thereby facilitating operations.

Solution to Problem

In order to solve the above-mentioned issues, according to the first aspect of the present invention, there is provided an information-sharing device including, in a second device connected to a first device, an information obtaining unit which obtains, through a communication unit of the second device, first application information indicating an application possessed by the first device, a shared information generating unit which generates shared information shared by the first device and the second device, based on the first application information obtained by the information obtaining unit, and a transmission control unit which transmits the shared information through the communication unit to the first device.

Further, according to the second aspect of the present invention, there is provided an information-sharing method including, in a second device connected to a first device, obtaining, through a communication unit of the second device, first application information indicating an application possessed by the first device, generating shared information shared by the first device and the second device, based on the obtained first application information, and transmitting the shared information through the communication unit to the first device.

Further, according to the second aspect of the present invention, there is provided an information-sharing program causing a second device connected to a first device to execute an information-sharing method including obtaining, through a communication unit of the second device, first application information indicating an application possessed by the first device, generating shared information shared by the first device and the second device, based on the obtained first application information, and transmitting the shared information through the communication unit to the first device.

Further, according to the second aspect of the present invention, there is provided a terminal device including an information obtaining unit which obtains, through a communication unit, first application information indicating an application possessed by another device connected thereto, a shared information generating unit which generates shared information shared with the other device, based on the first application information obtained by the information obtaining unit, and a transmission control unit which transmits the shared information through the communication unit to the other device.

Advantageous Effects of Invention

According to the present technology, a plurality of devices are allowed to share information about an application possessed by each device, whereby operations of the devices can be facilitated.

BRIEF DESCRIPTION OF DRAWINGS

FIG. 2 is a diagram showing an specific example of shared information.

DESCRIPTION OF EMBODIMENTS

An embodiment of the present technology will be described in detail hereinafter with reference to the appended drawings. Note that the present technology is not intended to be limited only to the embodiment below. Note that the description will be given in the following order.

<1. Embodiment>
[1-1. Configuration of Terminal Device]
[1-2. Configuration of Sound Output Device]
[1-3. Information Sharing Process]
<2. Variations>
<1. First Embodiment>

Figure 1:
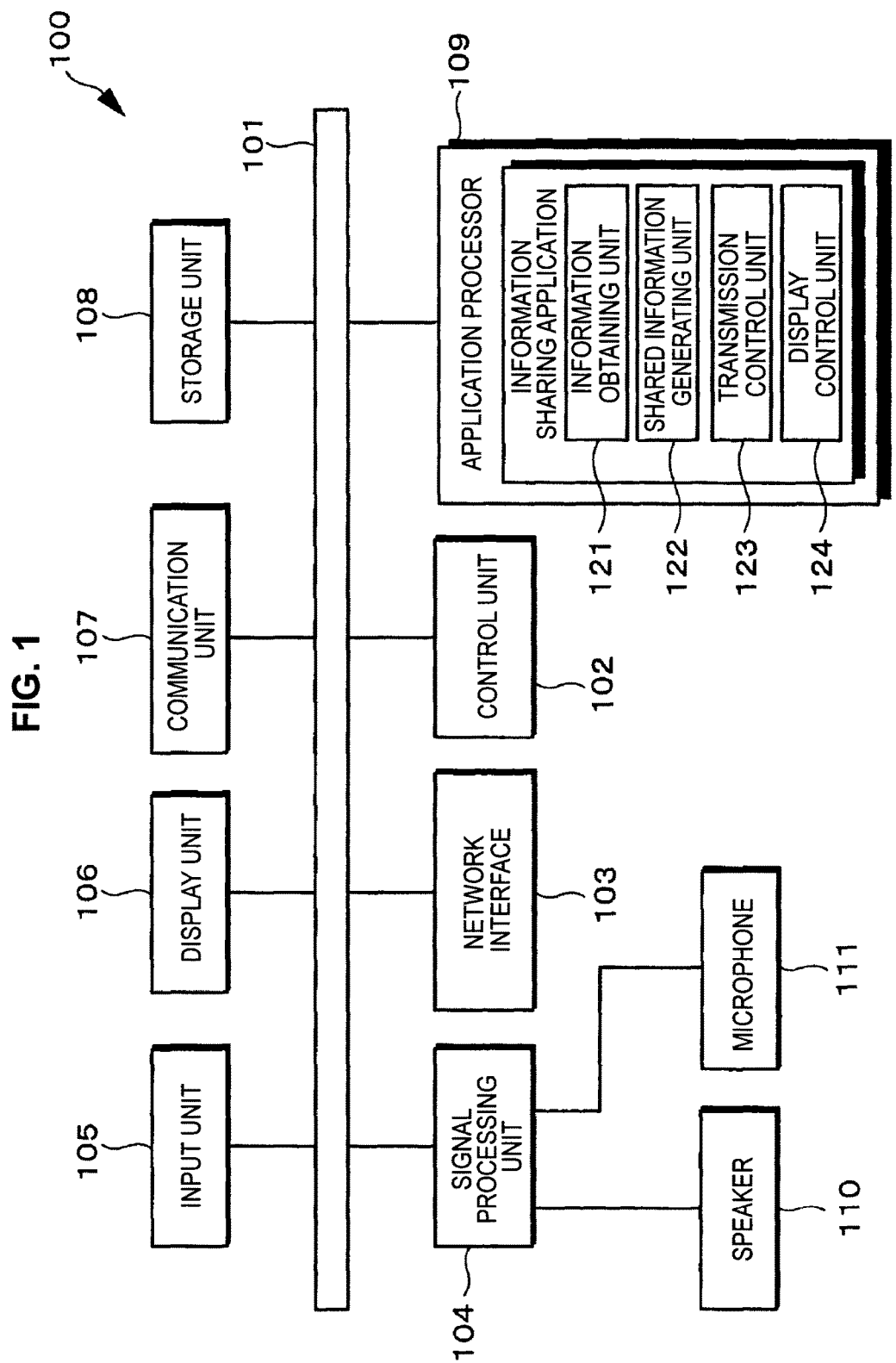
FIG. 1 is a block diagram showing a configuration of a terminal device which is an example of a second device according to the present technology.

FIG. 1 is a block diagram showing a configuration of a terminal device 100 in this embodiment. The terminal device 100 is an example of a second device in the appended claims. The terminal device 100 includes a data bus 101 to which a control unit 102, a network interface 103, a signal processing unit 104, an input unit 105, a display unit 106, a communication unit 107, a storage unit 108, and an application processor 109 are connected.

The control unit 102 includes, for example, a CPU (Central Processing Unit), a RAM (Random Access Memory), a ROM (Read Only Memory), and the like. The ROM stores a program which is read and executed by the CPU, etc. The RAM is used as a work memory for the CPU. The CPU controls the parts and entirety of the terminal device 100 by executing various processes according to the program stored in the ROM.

The network interface 103 performs, for example, transmission and reception of data between itself and an external base station etc. based on a predetermined protocol. The communication scheme may be any scheme, such as a wireless LAN (Local Area Network), Wi-Fi (Wireless Fidelity), communication via the 3G system, etc. By communication via the network interface 103, the terminal device 100 allows for connection to the Internet, conversation with others, etc.

The signal processing unit 104 includes a modulator-demodulator, an AD/DA converter, a sound codec (not shown), etc. The modulator-demodulator of the signal processing unit 104 modulates a sound signal to be transmitted, or demodulates a received signal. The signal to be transmitted is converted by the AD/DA converter into a digital signal, and the received signal is converted by the AD/DA converter into an analog signal. And, a speaker 110 which outputs sound and a microphone 111 which receives sound are connected to the signal processing unit 104.

The input unit 105 is an input means which is used by the user to perform various inputs to the terminal device 100. For example, the input unit 105 includes a button, a touch panel, a switch, etc. Alternatively, the input unit 105 may be integrated with the display unit 106 to form a touchscreen. When an input operation is performed by the user on the input unit 105, a control signal corresponding to the input is generated and output to the control unit 102. Thereafter, the control unit 102 performs a calculation process or a control corresponding to the control signal.

In this embodiment, the user performs, on the input unit 105, an operation of selecting an installed application (e.g., a cursor moving operation etc.), an application determining operation for activating a selected application, and the like.

The display unit 106 is a display means including, for example, an LCD (Liquid Crystal Display), a PDP (Plasma Display Panel), an organic EL (Electro Luminescence) panel, or the like. The display unit 106 displays a home screen which displays a menu of various operations of the terminal device 100, a song list, information (an artist name, a song title, etc.) about a song which is being played back, a video content, an image content, etc.

The communication unit 107 is a communication module for performing communication with the terminal device 100 by a technique, such as Bluetooth, USB connection, etc. The communication technique in the communication unit 107 is Bluetooth, which is wireless communication, communication by USB, which is wired communication, etc. A Bluetooth module which performs Bluetooth communication is a module which can transmit and receive data via Bluetooth-scheme near field communication. By the Bluetooth module, data is exchanged with a sound output device which is an external Bluetooth apparatus.

The Bluetooth module includes an antenna, a signal processing unit (not shown), etc. For example, when transmitting sound data to a sound output device 200 which is an external Bluetooth apparatus, etc., the Bluetooth module performs a predetermined signal process on sound data which is to be transmitted by the signal processing unit, and transmits the sound data through the antenna included therein to the sound output device 200. Also, when transmitting sound data to the sound output device 200, etc., the Bluetooth module receives sound data transmitted from the sound output device, using the antenna included therein, and supplies the sound data to the signal processing unit 104 included therein. Thereafter, the signal processing unit performs a predetermined signal process on the sound data to generate a sound signal. As a result, sound data played back by the terminal device 100 can be output from the sound output device 200, and sound data played back by the sound output device 200 can be output from the terminal device 100.

When USB, which is wired communication, is used as a communication scheme in the communication unit 107, the sound output device 200 and the terminal device 100 are connected together by a USB cable. Sound data is supplied from the terminal device 100 through the USB cable to the sound output device 200.

In this embodiment, the terminal device 100 and the sound output device 200 are connected together, the terminal device 100 plays back song data stored by the terminal device 100, and the song is output as sound from the sound output device 200.

Note that the connection technique may be any technique. Also, any connection technique capable of data communication may be employed in addition to Bluetooth and USB. Also, a communication scheme may be suitably selected based on the type of the terminal device 100, the type of an OS (Operation System), etc.

The storage unit 108 includes, for example, a large-capacity storage medium, such as an HDD, a flash memory, etc., and stores content data, such as a song which is to be played back by the terminal device 100, etc. Song data is stored in the storage unit 108 in a compressed audio form according to a format, such as WAV (RIFF waveform Sound Format), MP3 (MPEG Sound Layer-3), AAC (Advanced Sound Coding), etc. Also, song information containing the artist name, album title, song titles, overall playback time, playback time information etc. of songs is stored as metadata for song data in the storage unit 108. The song information can be obtained using, for example, CDDB (Compact Disc DataBase). Also, the user may be allowed to set arbitrarily.

The application processor 109 is a processing unit which executes various applications installed in the terminal device 100. The present technology is implemented by an information sharing application installed in the terminal device 100 being executed by the application processor 109. The application processor 109 executes the information sharing application to function as an information obtaining unit 121, a shared information generating unit 122, a transmission control unit 123, and a display control unit 124. Functions implemented by execution of the information-sharing application correspond to an information-sharing device in the appended claims.

The information obtaining unit 121 obtains information (first application information) indicating an application (corresponding to an application possessed by a first device in the appended claims) which outputs sound from an audio source, that is possessed by the sound output device 200, from the sound output device 200 through the communication unit 107. The audio source is an Internet radio, an external storage connected by USB or the like, a disk medium module which plays back a disk medium, etc.

Also, the information obtaining unit 121 obtains an information (second application information) indicating an application which has been selected by the user, from applications possessed by the terminal device 100, in order to be shared by the sound output device 200 and the terminal device 100.

Moreover, the information obtaining unit 121 receives information (operation information) indicating the detail of an application selecting operation performed in the sound output device 200, through the communication unit 107. The operation information will be described in detail below.

The shared information generating unit 122 causes the first and second application information obtained by the information obtaining unit 121 to coexist to generate shared information. The shared information is used in the terminal device 100, and is also transmitted through the communication unit 107 to the sound output device 200 under a control by the communication control unit 102. Thus, the shared information is shared between the sound output device 200 and the terminal device 100.

For example, as shown in FIG. 2, the shared information is information in the form of a list in which applications indicated by the first and second application information are ordered. This order corresponds to the order in which icons representing applications are displayed on the display units 106 of the terminal device 100 and the sound output device.

Note that, in the present technology, when communication is performed using Bluetooth, the first application information, Serial Port Profile is used to transmit and receive the shared information, the operation information, etc. between the terminal device 100 and the sound output device 200. Also, when USB is used to connect the sound output device and the terminal device 100 together, iAP is used to transmit and receive the first application information, the shared information, the operation information, etc.

Any information can be transmitted and received using Serial Port Profile or iAP. Therefore, by using these, various kinds of information described above used in the present technology can be transmitted and received. Note that any other technique that can be used to transmit and receive various kinds of information described above may be used. Also, any connection technique that can perform data communication may be employed in addition to Bluetooth and USB.

The display control unit 102 performs a control based on the shared information to display icons representing an audio source application of the sound output device 200 and an application of the terminal device 100 selected by the user on the display unit 106. Also, the display control unit 102 performs a control to display a cursor indicating selection of an application when the terminal device 100 and the sound output device 200 are used. These display controls will be described in detail below.

Note that the information sharing application may be provided to the user by being previously installed in the terminal device 100, or alternatively, may be installed into the terminal device 100 by the user himself or herself. The information sharing application is provided or sold by means of, for example, an application selling website or an application download service on the Internet. Alternatively, the information sharing application may be provided or sold by means of a transportable recording medium such as an optical disk, a semiconductor memory, etc. in which the information sharing application is recorded.

The speaker 110 is a sound output means for outputting sound, and outputs, as sound, a sound signal on which a predetermined process has been performed by the signal processing unit 104. As a result, the user can hear conversation voice, sound data stored in the terminal device 100, etc. Also, the microphone 111 is a device for inputting voice into the terminal device 100 for conversation, an instruction input by voice, etc. The signal processing unit 104 performs a predetermined process on voice input from the microphone 111.

The terminal device 100 is thus configured. The terminal device 100 is a mobile telephone, a smart phone, a mobile music player, a tablet terminal, etc. Also, although not shown, the terminal device 100 may include a camera function including an image capture unit, an image processing unit, etc., and a radio function, etc.

Figure 3:
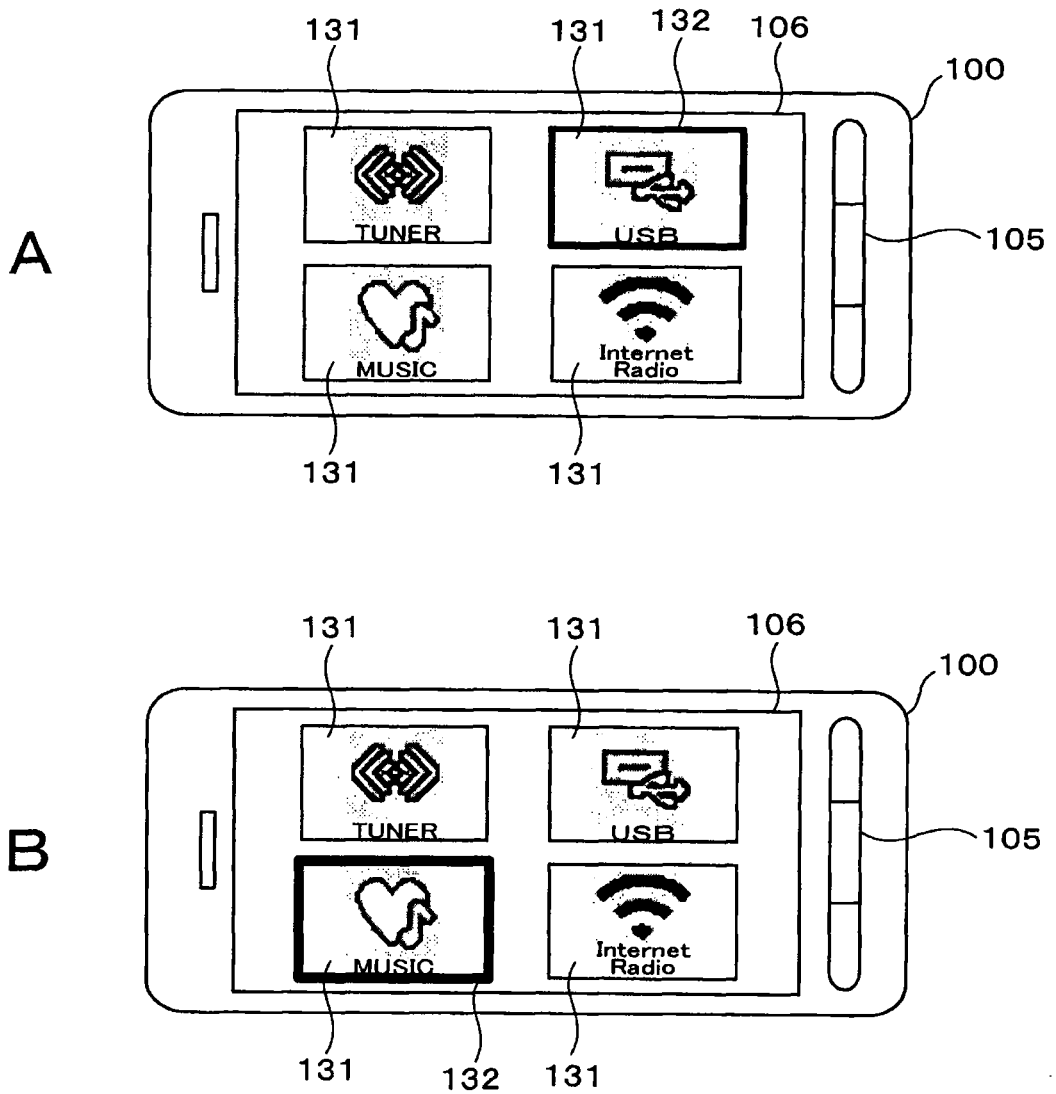
FIG. 3 is a diagram showing an example of an external appearance configuration of a terminal device.

FIG. 3 is a diagram showing an example external appearance configuration of the terminal device 100. In FIG. 3, the display unit 106, a touchscreen as the input unit 105, and a button as the input unit 105, of the terminal device 100, are shown.

The display unit 106 of the terminal device 100 displays a plurality of icons 131, 131, . . . representing applications indicated by the shared information. In this embodiment, icons representing an audio source of the sound output device and an application selected by the user on the terminal device 100 are displayed.

The user touches an icon 131 displayed on the display unit 106 using a finger, or presses the button as the input unit 105, to select an application. When an application is selected, a cursor 132 in the shape of a thick frame indicating the selected application is moved from a state of FIG. 3A to a state of FIG. 3B, for example. Thereafter, for example, by performing an application determination input by performing an input to the icon 131 of the selected application again, the selected application is activated.

Here, a page turning operation on the terminal device 100 will be described. FIG. 4A shows the first page on which a plurality of icons 131 indicating applications are displayed on the display unit 106 of the terminal device 100. In the state of FIG. 4A in which the first page is displayed, the screen is slid in the lateral direction by an input etc. to the touchscreen. In response to this, as shown in FIG. 4B, a transition state occurs in which the first page moves in the sliding direction while gradually disappearing, and at the same time, the second page slides and appears from an end of the display unit 106. And, after the transition state, when the sliding operation of the second page is completed, as shown in FIG. 4C the entirety of the second page is displayed on the display unit 106. Icons 131 displayed on the second page are different from those displayed on the first page. This series of display transition on the display unit 106 is referred to as "page turning," and an input operation to do this is referred to as a "page turning operation."

Figure 4:
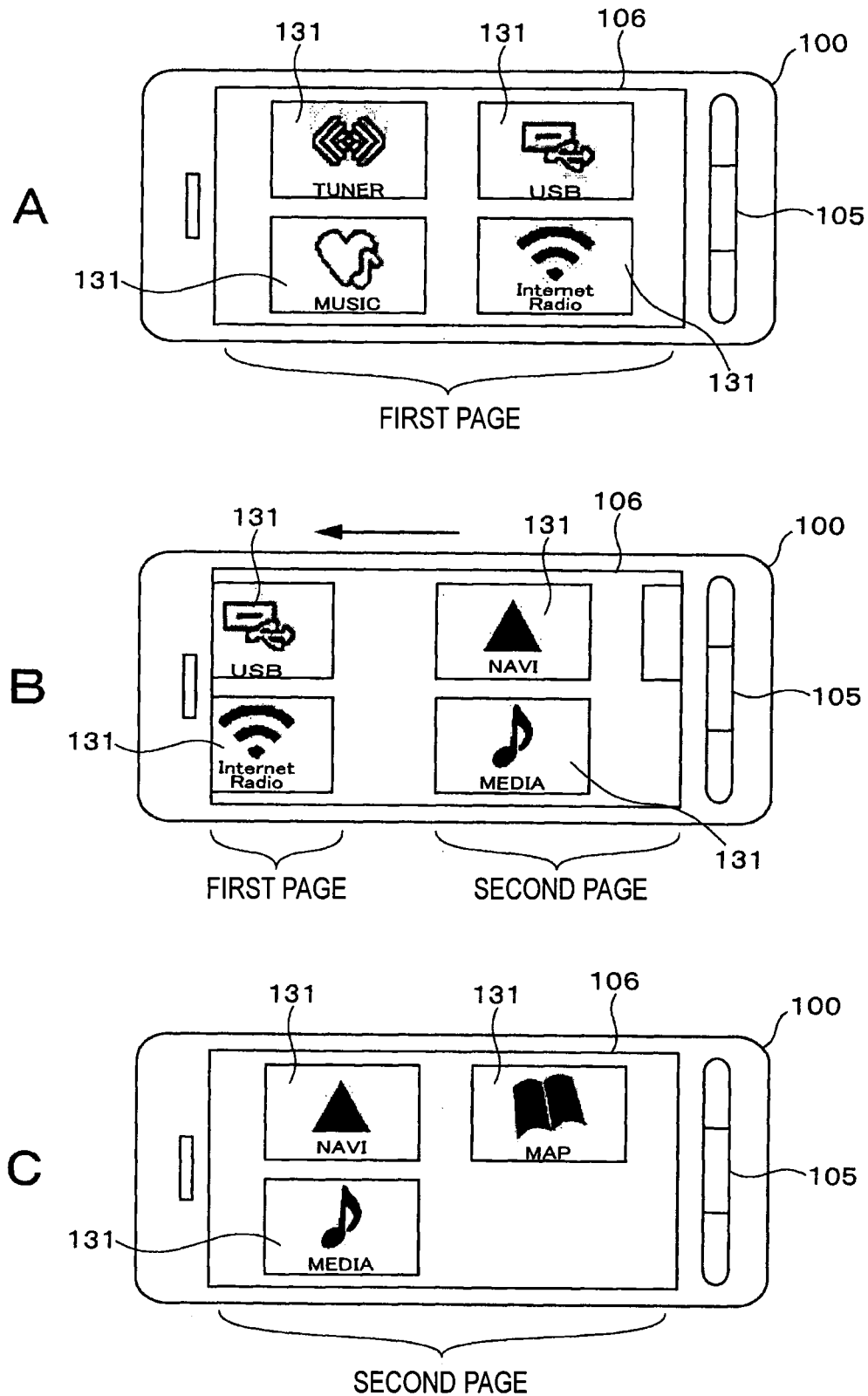
FIG. 4 is a diagram for describing a page turning operation on a display unit of a terminal device.

Note that although the transition from the first page to the second page has been described as an example in the description of FIG. 4, page turning can be similarly performed from the second page to the third page, from the third page to the fourth page, from the second page to the first page, etc. In the terminal device 100, the number of pages varies depending on the number of installed applications. The number of pages increases with an increase in the number of applications.

Typically, in mobile telephones, smart phones, tablet terminals, etc., the ions of applications are displayed in an arrangement of 5 (vertical direction)×4 (horizontal direction), 4 (vertical direction)×4 (horizontal direction), or the like. However, in this embodiment, as shown in FIG. 4, the display control unit 102 may perform a display control to display larger icons, e.g., 2 (vertical direction)×2 (horizontal direction), or the like. As a result, it is easier to perform an input operation on the terminal device 100.

Note that the external appearance configuration of the terminal device 100, the display form on the display unit 106, and the button arrangement as the input unit 105 shown in FIG. 4 are only for illustrative purposes, and these are not limited to those shown in FIG. 4.

[1-2. Configuration of Sound Output Device]

Figure 5:
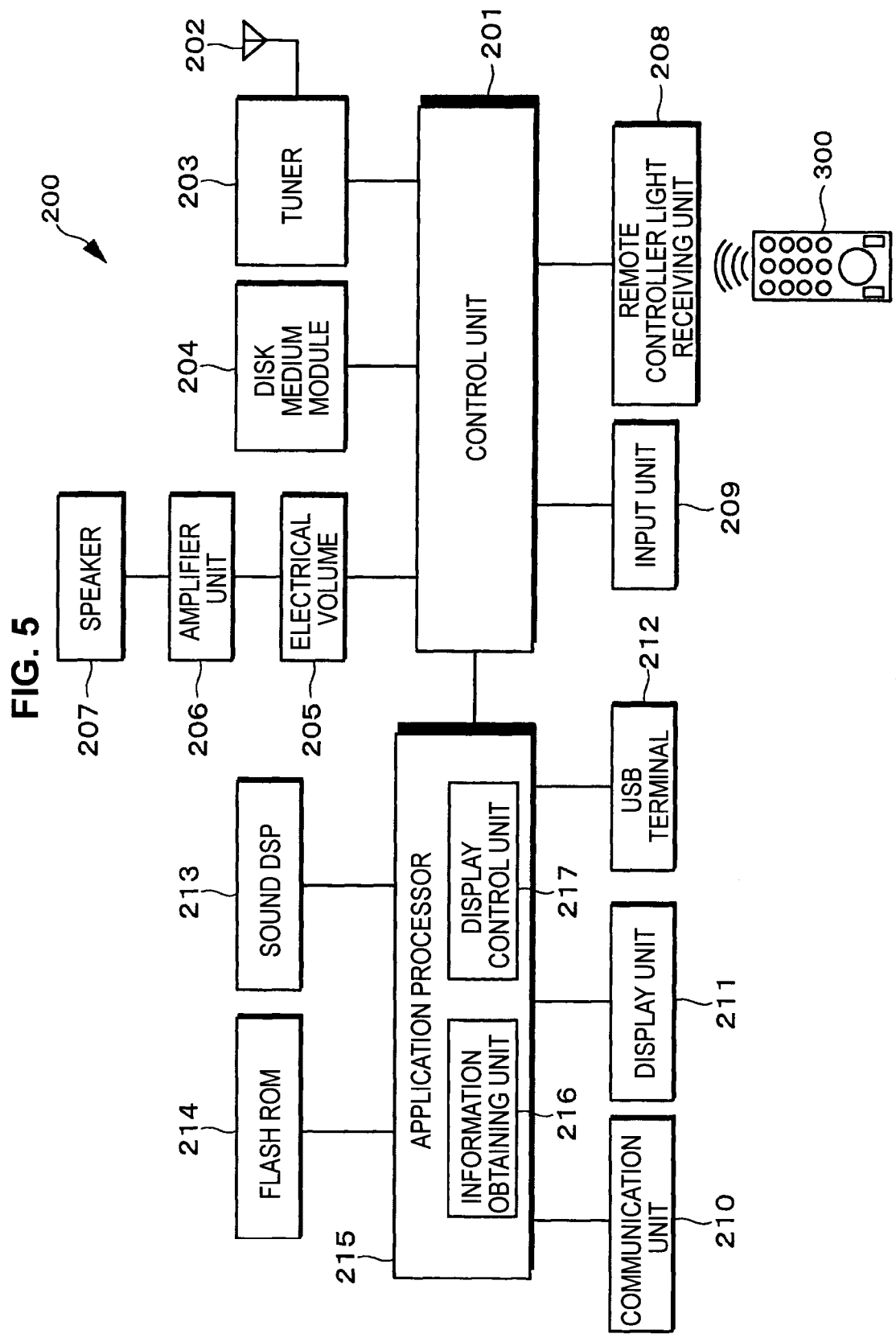
FIG. 5 is a block diagram showing a configuration of a sound output device which is an example of a first device according to the present technology.

FIG. 5 is a block diagram showing a configuration of the sound output device 200 of the embodiment of the present technology. The sound output device 200 is an example of the first device of the appended claims. The sound output device 200 may be, for example, a car audio device which outputs sound in a vehicle, a dock speaker, etc.

The sound output device 200 includes a control unit 201, a radio antenna 202, a tuner 203, a disk medium module 204, an electrical volume 205, an amplifier unit 206, a speaker 207, a remote controller light receiving unit 208, an input unit 209, a communication unit 210, a display unit 211, a USB terminal 212, a sound DSP (Digital Signal Processing) 213, a flash ROM 214, and an application processor 215.

The control unit 201 includes, for example, a CPU, a RAM, a ROM, and the like. The ROM stores a program which is read and executed by the CPU, etc. The RAM is used as a work memory for the CPU. The CPU controls the parts and entirety of the sound output device 200 by executing various processes according to the program stored in the ROM.

The radio antenna 202 is an antenna which is used to receive radio broadcast radio waves, and is connected to the tuner 203. The tuner 203 performs processes such as demodulation and analog/digital conversion of a radio broadcast signal received by the radio antenna 202, decoding of encoded data, etc., and the like, to recover radio sound data. The radio sound data is transferred through the electrical volume 205 and the amplifier unit 206 to the speaker 207 under a control by the control unit 201, and is output as sound by the speaker 207.

The disk medium module 204 is a disk playback device which reads an audio signal written in a disk-shaped recording medium, and performs a predetermined signal process on the read audio signal to obtain a sound signal. The obtained sound signal is transferred through the electrical volume 205 and the amplifier unit 206 to the speaker 207 under a control by the control unit 201, and is output as sound from the speaker 207. Note that the disk-shaped recording medium is a CD (Compact Disc), a DVD (Digital Versatile Disc), a BD (Blu-ray Disc), etc.

The electrical volume 205 adjusts the volume by amplifying a sound signal supplied from the radio tuner 203, the disk medium module 204, the communication unit 210, the USB terminal 212, etc., under a control by the control unit 201. The sound signal whose volume has been adjusted is supplied to the amplifier unit 206. The amplifier unit 206 performs a predetermined amplification on the sound signal supplied from the electrical volume 205, and supplies the resultant sound signal to the speaker 207. The speaker 207 is a sound output means which outputs the sound signal supplied from the amplifier unit 206 as sound to the outside.

The remote controller light receiving unit 208 receives a control signal which is transmitted by the user's operation from a remote controller 300 which is an accessory to the sound output device 200, and outputs the control signal to the control unit 201.

The input unit 209 is an input means which is used by the user to perform various input operations to the sound output device 200. The input unit 209 includes, for example, a button, a touch panel, a switch, etc. Also, the input unit 209 may be integrated with the display unit 211 to form a touchscreen. When the user performs an input operation on the input unit 209, a control signal corresponding to the input operation is generated and output to the control unit 201. Thereafter, the control unit 201 performs a calculation process or a control corresponding to the control signal.

In this embodiment, the user can perform an application selecting operation, a determination operation for activating a selected application, and the like on the input unit 209.

The display unit 211 is a display means including, for example, an LCD, a PDP, an organic EL panel, or the like. The display unit 211 displays a home screen which displays a menu of various operations of the sound output device 200, a song list, information (an artist name, a song title, etc.) about a song which is being played back, etc. When the sound output device 200 is equipped for video contents, image contents, etc., these are also displayed.

Moreover, when the input unit 209 and the display unit 211 form a touchscreen, the display unit 211 also displays an user interface image, such as an operation screen (e.g., a software button, volume adjustment, content selection, etc.) etc., as the input unit 209.

The communication unit 210 performs communication with the terminal device 100. The communication unit 210 has a configuration similar to that of the terminal device. Sound data received by the communication unit 210 from the terminal device is supplied to the sound DSP 213.

Also, when Bluetooth is used as the communication scheme, Serial Port Profile is used to transmit and receive the first application information, the shared information, the operation information, etc. between the sound output device 200 and the terminal device 100. Also, when USB is used to connect the sound output device and the terminal device 100 together, iAP can be used to transmit and receive any information, such as the first application information, the shared information, the operation information, etc.

Note that the connection technique may be any technique. Also, any connection technique that can perform data communication may be employed in addition to Bluetooth and USB.

The USB terminal 212 is a connection terminal compliant with the USB standards for connecting an external device, an external recording medium, etc. to the sound output device 200. For example, an external storage, such as an external HDD (Hard Disc Drive), a USB memory, etc., which stores sound data is connected to the USB terminal 212. Sound data stored in the external storage is output through the electrical volume 205 and the amplifier unit 206 to the speaker 207 under a control by the control unit 201, and is output as sound by the speaker 207.

The sound DSP 213 performs a predetermined sound signal process on sound data supplied from the Bluetooth module as the communication unit 210, and supplies the resultant sound data to the electrical volume 205. A sound signal is passed through the electrical volume 205 and the amplifier unit 206, and is finally output as sound from the speaker 207.

The flash ROM 214 is a non-volatile memory, and stores various items of data, such as apparatus information which is information about a Bluetooth apparatus, frequency information of a radio broadcast, etc. And, the stored apparatus information or frequency information is read out and supplied to the control unit 201 in response to a request from the control unit 201.

The application processor 215 performs a predetermined process in the sound output device 200, corresponding to an operation of the information sharing application in the terminal device. The application processor 215 functions as an information obtaining unit 216 and a display control unit 217 by executing a predetermined application.

The information obtaining unit 216 obtains, through the communication unit 210, the shared information transmitted from the terminal device 100. Also, the information obtaining unit 216 obtains, through the communication unit 210, information (operation information) indicating the application selecting operation performed by the user on the terminal device 100.

The display control unit 217 performs a display control in the display unit 211 based on the shared information obtained by the information obtaining unit 216. The display control unit 217 also performs a control to display a cursor indicating the selection of an application, etc. Moreover, the display control unit 217 also performs a process of updating a display on the display unit 211 based on operation information. These display controls will be described in detail below.

In this embodiment, the sound output device 200 has three audio sources which are a tuner, an external storage which is connected to USB and stores sound data, and a disk medium module. Note that the number and types of audio sources are not limited to these. The sound output device 200 may include a single audio source or more audio sources.

Figure 6:
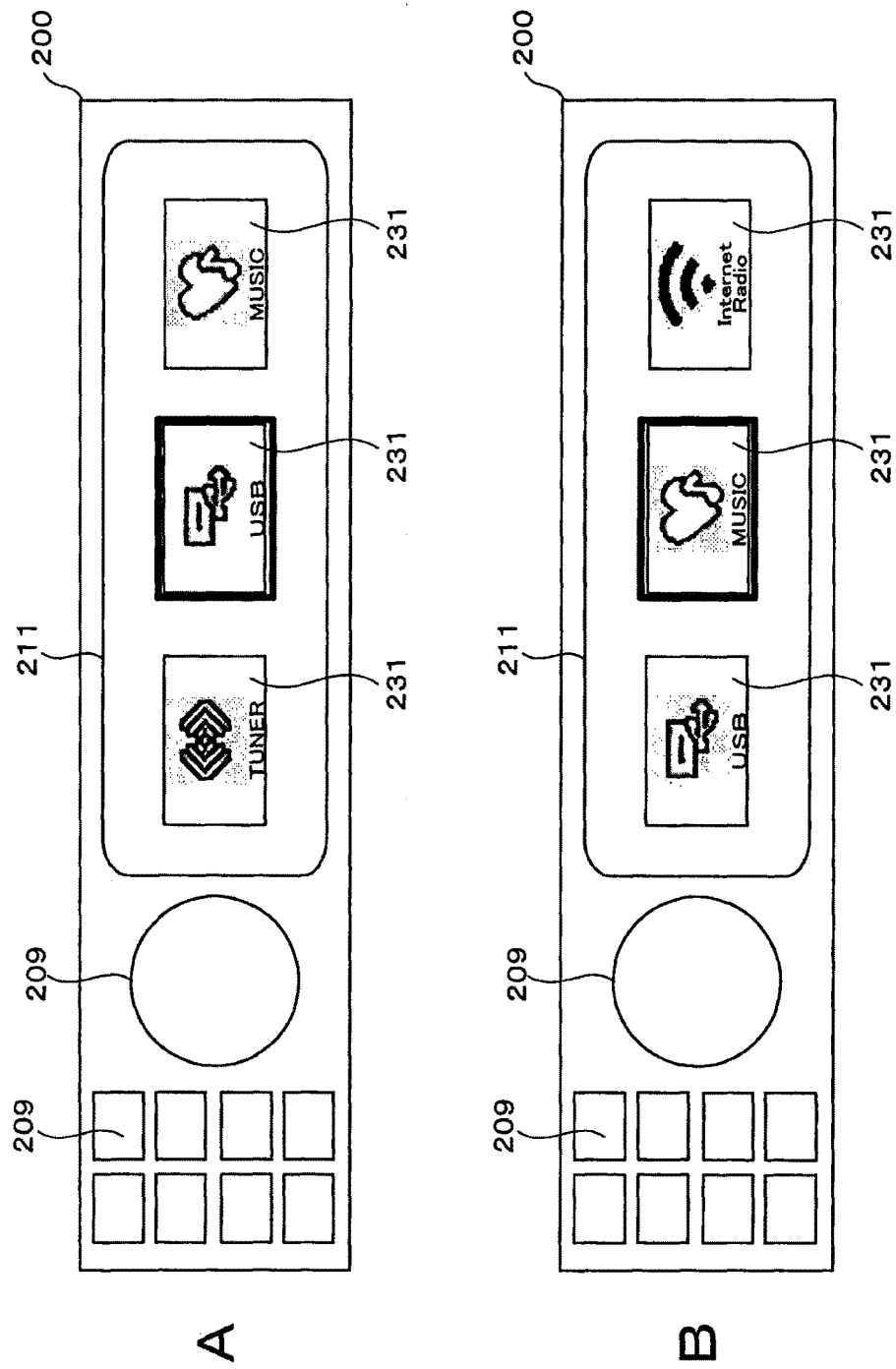
FIG. 6 is a diagram showing an example of an external appearance configuration of a sound output device.

FIG. 6 is a diagram showing an example external appearance configuration of a front panel of the sound output device 200. FIG. 6 shows the input unit 209 and the display unit 211 which are provided on the front panel of the sound output device 200.

The display unit 211 of the sound output device 200 displays a plurality of icons 231, 231, . . . representing applications indicated by the shared information. In this embodiment, icons representing an audio source of the sound output device 200 and an application selected by the user on the terminal device 100 are displayed.

In the example of FIG. 6, an application selected by the user is displayed at almost the center of the display unit 211. In FIG. 6, USB has been selected. Thereafter, when the user selects a different application, the icons moves laterally, changing from a state shown in FIG. 6A to a state shown in FIG. 6B. In FIG. 6B, an icon "MUSIC" which has been next selected is displayed at almost the center of the display unit 211. Note that "USB" is an icon representing an application which plays back sound data stored in an external storage connected to the USB terminal 212. Also, "MUSIC" is an icon representing an application which plays back sound data in the disk medium module.

Note that the external appearance configuration of the sound output device 200 and the display form of the display unit 211 shown in FIG. 6 are only for illustrative purposes, and are not limited to those of FIG. 6. For example, the display of the sound output device 200 may display icons in a plurality of lines instead of a single line, as with the display of the terminal device.

[1-3. Information Sharing Process]

Next, information sharing implemented by the above-described terminal device 100 and sound output device 200, and a process using the shared information, will be described.

In the present technology, the display unit 211 of the sound output device 200 which is the first device, and the display unit 106 of the terminal device 100 which is the second device, display an icon representing a shared application. Also, when an application selecting operation is performed on one of the devices, an operation of selecting the same application is performed in the other device, being linked with the application selecting operation.

Therefore, for example, an application in the terminal device 100 can be selected by an input to the sound output device 200. And, after the selection of the application, when an application determining operation is performed on one of the devices, application determination is performed in the other device having the application, which is then activated. Therefore, by operating one of the devices, an application can be selected and activated in the other device.

Figure 7:
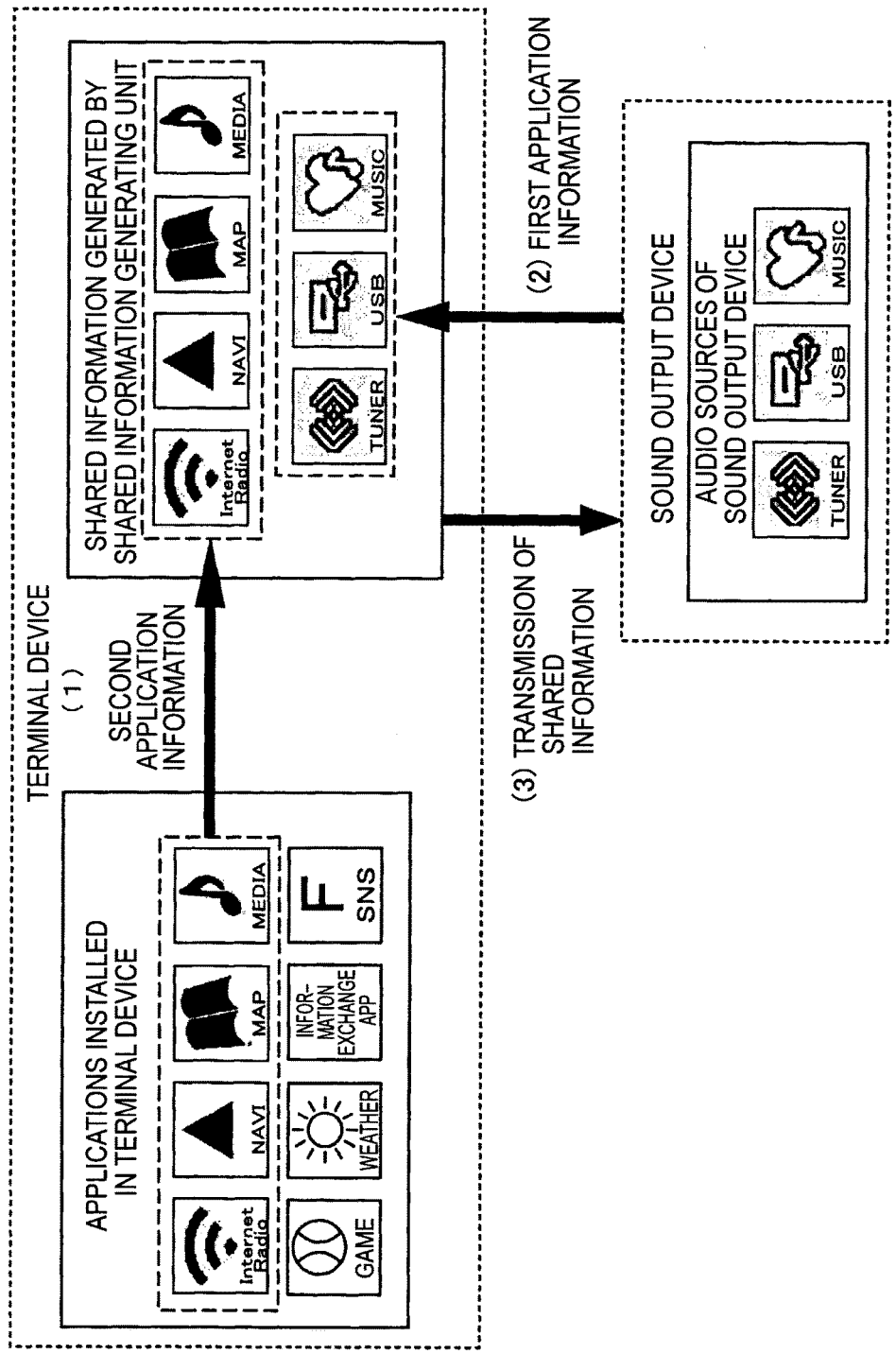
FIG. 7 is a conceptual diagram for describing exchange of information between a terminal device and a sound output device.
Figure 8:
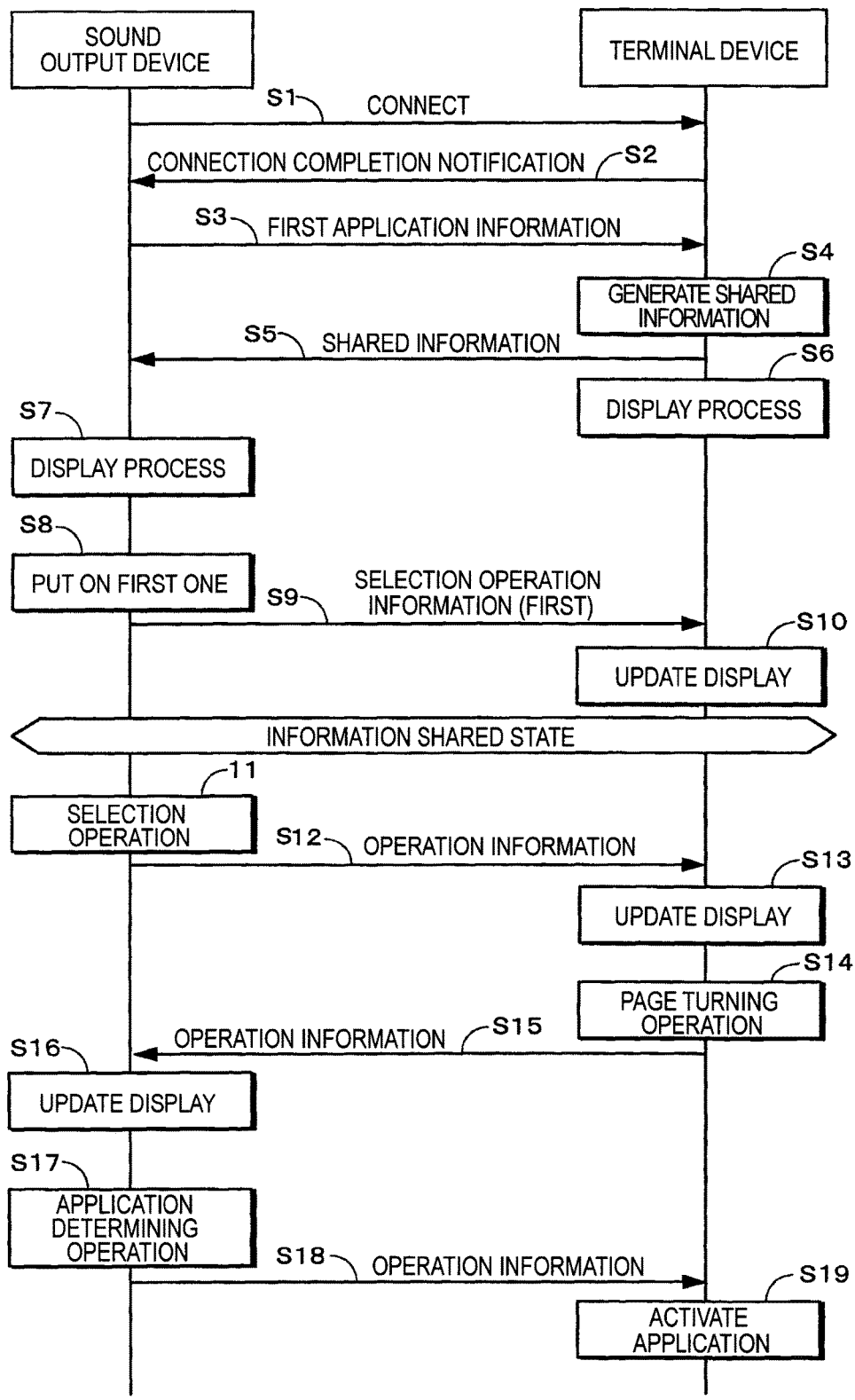
FIG. 8 is a sequence diagram showing a flow of a process performed between a terminal device and a sound output device.
Figure 9:
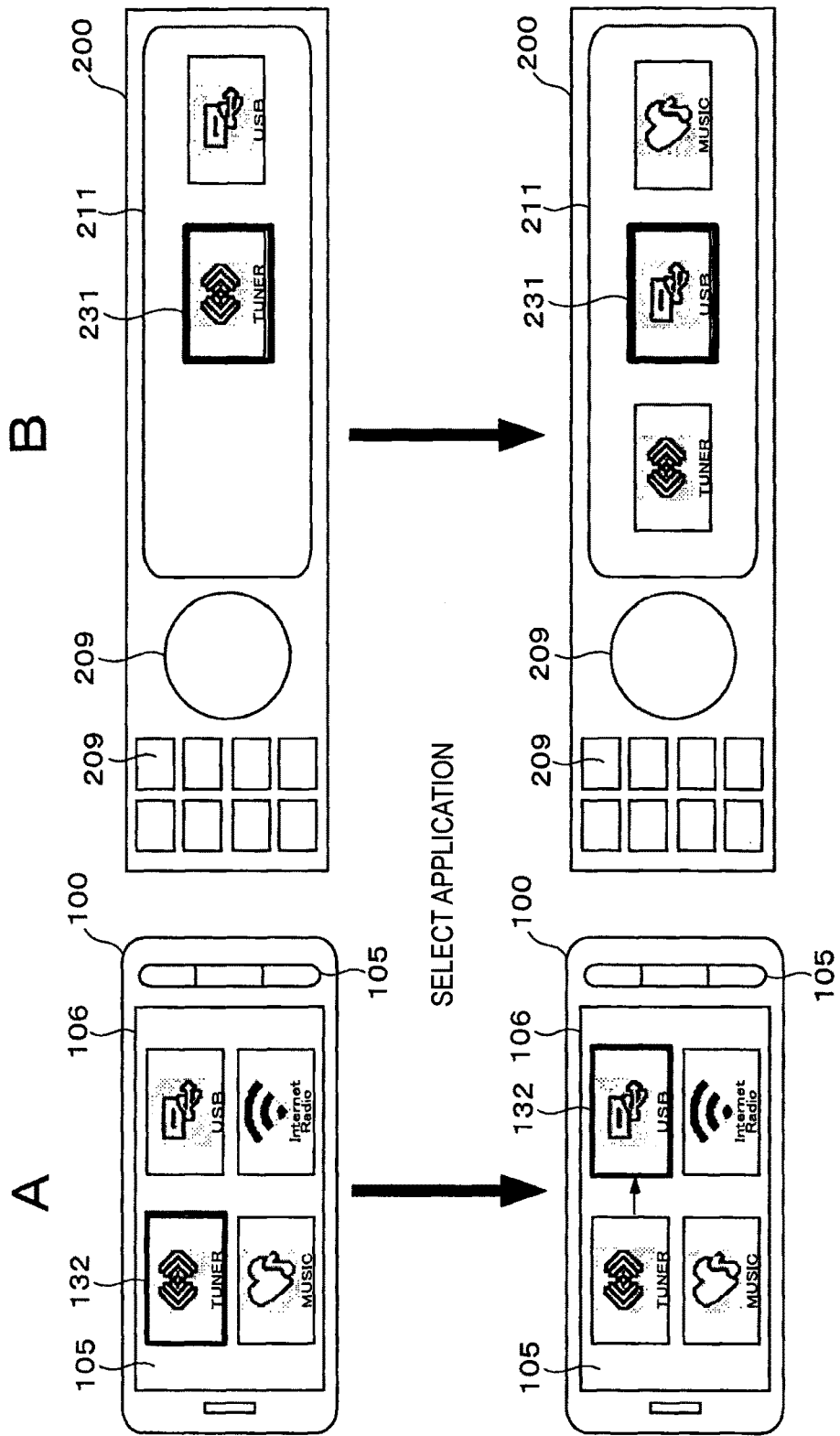
FIG. 9 is a diagram showing a link between application selection displays on a sound output device and a terminal device.

FIG. 7 is a conceptual diagram for describing exchange of information between the sound output device 200 and the terminal device 100. FIG. 8 is a sequence diagram showing a process between the sound output device 200 and the terminal device 100. FIG. 9 is a diagram showing states of the sound output device 200 and the terminal device 100 in which an application is synchronously selected.

Initially, as a precondition for the process, as shown in FIG. 7, for example, a plurality of applications, such as GAME, WEATHER, MAP, etc., are installed in the terminal device 100. Also, as described above, the information sharing application is also assumed to be installed.

And, it is assumed that, in advance, as shown in (1) of FIG. 7, the user has selected an application shared with the sound output device 200 from applications installed in the terminal device 100, and the information obtaining unit 121 has obtained information (second application information) about the selected application.

Also, the sound output device 200 has one or more audio sources. The function of outputting and playing back sound sources of the audio sources is an application in the sound output device. As shown in FIGS. 5 and 7, in this embodiment, the sound output device 200 has three audio sources which are a radio tuner, an external storage which is connected to USB and stores sound data, and a disk medium module. Note that the number and types of audio sources are not limited to these.

Initially, in step S1, the sound output device 200 and the terminal device 100 are connected together. As described above, the connection is performed by the communication units of both of the devices according to a scheme, such as Bluetooth, USB connection, etc. When the connection is established according to Bluetooth, Serial Port Profile is used to transmit and receive information between the sound output device 200 and the terminal device 100. When the connection is established according to USB, iAP is used to transmit and receive information between the sound output device 200 and the terminal device 100.

When the connection between the sound output device 200 and the terminal device 100 is established, in the next step S2 the terminal device 100 transmits a connection completion notification to the sound output device 200. Note that the process of FIG. 8 may be reversed, i.e., the terminal device 100 performs connection to the sound output device 200, and the sound output device 200 transmits a connection completion notification to the terminal device 100.

Next, in step S3, as shown in (2) of FIG. 7, the sound output device 200 transmits, to the terminal device 100, information (first application information) indicating the type of an audio source playback application included in the sound output device 200. In FIG. 7, information indicating that the sound output device 200 has three audio sources which are a tuner, an external storage which is connected to USB, and a disk medium module, is transmitted to the sound output device 200.

Next, in step S4, the shared information generating unit 122 of the terminal device 100 combines the second application information selected by the user and the first application information together to cause the application information of both of the devices to coexist, thereby generating the shared information. The shared information is in the form of a list in which application types are ordered as described above with reference to FIG. 4. The shared information contains both the application of the sound output device 200 and the application of the terminal device 100.

Next, in step S5, as shown in (3) of FIG. 7, the terminal device 100 transmits the shared information to the sound output device 200 under a control by the transmission control unit 123 of the terminal device 100. The shared information allows the sound output device 200 and the terminal device 100 to share information about their applications. Thereafter, in step S6, the display control unit 124 of the terminal device 100 performs a display process based on the shared information. As a result, as shown in the top row of FIG. 9A, the display unit 106 of the terminal device 100 displays icons representing an audio source of the sound output device 200 and an application selected by the user on the terminal device 100.

Also, in step S7, similarly, the display control unit 217 of the sound output device 200 performs a display process based on the shared information. As a result, as shown in the top row of FIG. 9B, the display unit 211 of the sound output device 200 displays icons representing an audio source of the sound output device 200 and an application selected by the user on the terminal device 100.

Note that although the sequence diagram of FIG. 8 shows that after a display control in the terminal device 100, a display control is performed in the sound output device 200, the order is not limited to this, and both of the display controls are desirably performed substantially simultaneously.

Next, in step S8, the sound output device 200 causes the first one of the applications indicated by the shared information to be in a selected state. The selected state which occurs, for example, when an application is selected by moving a cursor, means that the cursor is positioned on the first application. Thereafter, in step 9, the information obtaining unit 121 of the terminal device 100 obtains operation information of the sound output device 200. Note that the operation information obtained in step S9 is information indicating that an application located at the first position of the applications indicated in the shared information has been selected.

Next, in step S10, the display control unit 124 of the terminal device 100 updates a display on the display unit 106 of the terminal device 100 based on the operation information. Note that, in this case, the display control unit 124 performs a display control to provide a display indicating that the application located at the first position in the shared information has been selected. For example, the application selecting cursor is positioned on the first application, etc.

Thus, by the process until step S10, the sound output device 200 and the terminal device 100 are caused to be in a synchronous state in which the sound output device 200 and the terminal device 100 share a source of the sound output device 200 and an application of the terminal device 100.

Next, in step S11, the input unit 209 of the sound output device 200 accepts the user's application selecting operation. Next, in step S12, the information obtaining unit 121 of the terminal device 100 obtains, from the sound output device 200, operation information indicating a detail of the selection operation accepted by the sound output device 200 in step S11. This operation information indicates the ordinal position of an application which has been selected in the shared information which is in the form of a list in which shared applications are ordered.

Thereafter, in step S13, the display control unit 124 of the terminal device 100 updates a display on the display unit based on the operation information, thereby updating an application selection display. As shown in FIG. 2, the shared information is list-form information indicating applications. In the shared information, ordinal numbers corresponding to the order of display are assigned to applications. Therefore, the operation information indicating the ordinal position of an application which has been selected is shared by the sound output device 200 and the terminal device 100, and the application selection display is updated based on the operation information, whereby the location of the cursor can be synchronized between the sound output device 200 and the terminal device 100.

A specific example of the process by steps S11 to S13 is shown in FIG. 9. FIG. 9A shows a display on the display unit 106 of the terminal device 100, and FIG. 9B is a display on the display unit 211 of the sound output device 200.

In states shown in the top rows of FIGS. 9A and 9B, "TUNER" has been selected as an application. This indicates an application which outputs radio sound obtained by a radio tuner. In this state, when the user performs an input to the sound output device 200 to select "USB" at the second position, as shown in the bottom row of FIG. 9B the display of the sound output device 200 is updated to a state in which "USB" has been selected. Thereafter, operation information indicating that the second application has been selected in the sound output device 200 is transmitted to the terminal device 100. Based on this operation information, the display control unit 124 of the terminal device 100 performs a display control, whereby, as shown in the bottom row of FIG. 9A, "USB" is also selected in the terminal device 100. Thus, the selection of an application can be synchronized based on the shared information and the operation information. "USB" indicates an application which plays back sound data stored in a USB-connected external storage.

Also, when the user performs a page turning operation on the terminal device 100 as shown in step S14, in step S15 the operation information is transmitted to the sound output device 200, and is obtained by the information obtaining unit of the sound output device 200. Note that even when a page turning operation is performed, the operation information is information which indicates the ordinal position of an application which has been selected from the applications indicated by the shared information.

Thereafter, in step S16, the display control unit of the sound output device 200 updates a display on the display unit based on the operation information, thereby updating the application selection display.

When, after the application selecting operation shown in the above steps S11 to S15 and the transmission and reception of the operation information corresponding to the application selecting operation, as shown in step S17 the user performs an application determining operation, in step S18 the information obtaining unit 121 of the terminal device 100 obtains the operation information indicating the determining operation. Thereafter, in step S19, in the terminal device 100, the application determined in the sound output device 200 is activated.

Note that steps S11 to S16 show an example process which is performed between the sound output device 200 and the terminal device 100 after the information shared state has been established, and are not necessarily performed in the order shown in FIG. 8. For example, the application determining operation may be performed after the process of steps S11 to S13.

Thus, according to this embodiment, an application can be selected and determined on the terminal device 100 and the sound output device 200 by an input operation to the sound output device 200. Also, conversely, an application can be selected and determined in the sound output device 200 and the terminal device 100 by an input operation to the terminal device 100. Therefore, an application and a source can be browsed, selected, determined, etc. without bringing back the device and the terminal, with the difference between the devices being eliminated.

Also, the screen displays of the sound output device 200 and the terminal device 100 are linked together, and therefore, it is not necessary to perform an input operation and viewing of a display on the same device. It is possible to perform an input operation on the sound output device 200 and view a display on the terminal device 100. This can be reversed, i.e., it is possible to perform an input operation on the terminal device 100 and view a display on the sound output device 200.

It is illegal to operate the terminal device 100, such as a mobile telephone, a smart phone, etc., while driving a vehicle, etc. Therefore, the sound output device 200 is used as a car sound system in a vehicle, and music data etc. stored in the terminal device 100 is played back by performing an input operation on the sound output device 200. Sound data played back in the terminal device 100 is supplied through the communication unit to the sound output device 200, which then outputs the sound data as sound. As a result, an application can be activated in the terminal device 100, music stored in the terminal device 100 can be played back, etc. without directly operating the terminal device 100.

Note that even after an application has been activated, displays of various items of information on the display units of both of the devices may be linked together. In general, compared to the terminal device 100 such as a smart phone etc., the display performance of the sound output device 200 such as a car audio etc. is often limited. Therefore, when an audio source of the sound output device 200 is activated, the display performance of the terminal device 100 such as a smart phone etc. may be utilized to perform, on the terminal device 100, an object display (an image display, an animation representation, a character string display, etc.) superior to that of the sound output device 200.

<6. Variations>

An embodiment of the present technology has been specifically described above, whilst the present technology is not limited to the above embodiment. Various alterations and modifications can be made based on the technical requirements of the present technology.

While, in the embodiment, the first device is the sound output device 200 and the second device is the terminal device 100, specific devices are not limited to these devices. The present technology is applicable to any device that can perform two-way communication. For example, both of the first and second devices may be the terminal device 100, such as a mobile telephone, a smart phone, a tablet terminal, etc. Also, a combination of a television as one device and the terminal device 100 as the other device may be available.

An input to the sound output device 200 and the terminal device 100 may be performed by the speech recognition function of a smart phone etc. in addition to a touch operation to the touchscreen and a button operation.

Additionally, the present technology may also be configured as below.

(1)

An information-sharing device including, in a second device connected to a first device;

an information obtaining unit which obtains, through a communication unit of the second device, first application information indicating an application possessed by the first device;

a shared information generating unit which generates shared information shared by the first device and the second device, based on the first application information obtained by the information obtaining unit; and a transmission control unit which transmits the shared information through the communication unit to the first device.

(2)

The information-sharing device according to (1), wherein the information obtaining unit also obtains second application information indicating an application possessed by the second device, and the shared information generating unit generates the shared information based on the first application information and the second application information.

(3)

The information-sharing device according to (2), wherein the second application information is information indicating an application selected by a user from applications possessed by the second device.

(4)

The information-sharing device according to any one of (1) to (3), further including:

a display control unit which performs a control to display the application on a display unit included in the second device based on the shared information.

(5)

The information-sharing device according to (4), wherein the display control unit performs a display control so that icons representing an application selected by a user from applications possessed by the second device and an application possessed by the first device, are displayed on the display unit.

(6)

The information-sharing device according to (5), wherein the information obtaining unit also obtains operation information indicating the application selecting operation by the user on the first device, and the display control unit updates a display of an application on the display unit based on the operation information.

(7)

An information-sharing method including, in a second device connected to a first device;

obtaining, through a communication unit of the second device, first application information indicating an application possessed by the first device;
generating shared information shared by the first device and the second device, based on the obtained first application information; and
transmitting the shared information through the communication unit to the first device.

(8)
An information-sharing program causing a second device connected to a first device to execute an information-sharing method including:
obtaining, through a communication unit of the second device, first application information indicating an application possessed by the first device;
generating shared information shared by the first device and the second device, based on the obtained first application information; and
transmitting the shared information through the communication unit to the first device.

(9)
A terminal device including:
an information obtaining unit which obtains, through a communication unit, first application information indicating an application possessed by another device connected thereto;
a shared information generating unit which generates shared information shared with the other device, based on the first application information obtained by the information obtaining unit; and
a transmission control unit which transmits the shared information through the communication unit to the other device.

REFERENCE SIGNS LIST 100 terminal device
105 input unit
106 display unit
107 communication unit
109 application processor
121 information obtaining unit
122 shared information generating unit
123 transmission control unit
124 display control unit
200 sound output device
209 input unit
210 communication unit
211 display unit
215 application processor
216 information obtaining unit
217 display control unit

The invention claimed is:
1. An information-sharing device, comprising:
circuitry configured to:
obtain, from a sound output device, first application information, wherein the first application information indicates at least one first application of the sound output device and types of audio source devices connected to the sound output device,
wherein each audio source device of the audio source devices corresponds to an audio source that outputs audio data to the sound output device;
obtain second application information that indicates at least one second application on the information-sharing device;
generate shared information that is shared between the sound output device and the information-sharing device,
wherein the shared information is generated in a form of a list, wherein the list includes an order of an arrangement of a plurality of icons associated with the at least one first application and the at least one second application, and
wherein the order includes an ordinal position of each of the plurality of icons in the list,
wherein the shared information is generated based on the first application information and the second application information;
transmit the generated shared information to the sound output device;
select a first icon of the plurality of icons based on operation information received from the sound output device, wherein the operation information indicates an ordinal position of the first icon that is displayed on the sound output device; and
control a display screen of the information-sharing device to display the selected first icon.

2. The information-sharing device according to claim 1, wherein the second application information indicates a selection of the at least one second application on the information-sharing device.

3. The information-sharing device according to claim 1, wherein the circuitry is further configured to control the display screen to display the at least one first application and the at least one second application based on the shared information.

4. The information-sharing device according to claim 1, wherein
the circuitry is further configured to:
obtain, from the sound output device, the operation information which indicates a selection of the at least one first application associated with the first icon on the sound output device, and
update the display of the first icon based on the operation information to display the at least one first application in a selected state.

5. The information-sharing device according to claim 1, wherein the at least one first application is different from the at least one second application.

6. The information-sharing device according to claim 1, wherein the circuitry is further configured to:
obtain, from the sound output device, the operation information which indicates a selection of one of the at least one first application associated with the first icon or the at least one second application associated with a second icon of the plurality of icons on the sound output device, and
activate one of the at least one first application or the at least one second application based on the operation information.

7. The information-sharing device according to claim 1, wherein the first application information includes information of icons of the at least one first application.

8. The information-sharing device according to claim 1, wherein the second application information includes information of icons of the at least one second application.

9. The information-sharing device according to claim 1, wherein the first application information indicates the audio source devices that one of store the audio data, receive and tune broadcast data, or playback the audio data from a recording medium.

10. An information-sharing method, comprising:
  in an information-sharing device:
    obtaining, from a sound output device, first application information, the first application information indicating at least one first application of the sound output device and types of audio source devices connected to the sound output device, and wherein each audio source device of the audio source devices corresponds to an audio source that outputs audio data to the sound output device;
    obtaining second application information indicating at least one second application on the information-sharing device;
    generating, using circuitry, shared information that is shared between the sound output device and the information-sharing device,
    wherein the shared information is generated in a form of a list, wherein the list includes an order of an arrangement of a plurality of icons associated with the at least one first application and the at least one second application,
    wherein the order corresponds to an ordinal position of each of the plurality of icons in the list, and
    wherein the shared information is generated based on the first application information and the second application information;
    transmitting the generated shared information from the information-sharing device to the sound output device;
    selecting an icon of the plurality of icons based on operation information received from the sound output device, wherein the operation information indicates an ordinal position of the icon that is displayed on the sound output device; and
    controlling a display screen of the information-sharing device to display the selected icon.

11. A non-transitory computer-readable medium having stored thereon, computer-executable instructions which, when executed by an information-sharing device, cause the information-sharing device to execute operations, the operations comprising:
  obtaining, from a sound output device, first application information, the first application information indicating at least one first application of the sound output device and types of audio source devices connected to the sound output device, and wherein each audio source device of the audio source devices corresponds to an audio source that outputs audio data to the sound output device;
  obtaining second application information indicating at least one second application on the information-sharing device;
  generating shared information that is shared between the sound output device and the information-sharing device,
  wherein the shared information is generated in a form of a list, wherein the list includes an order of an arrangement of a plurality of icons associated with the at least one first application and the at least one second application, and
  wherein the order corresponds to an ordinal position of each of the plurality of icons in the list,
  wherein the shared information is generated based on the first application information and the second application information;
  transmitting the generated shared information from the information-sharing device to the sound output device;
  selecting an icon of the plurality of icons based on operation information received from the sound output device, wherein the operation information indicates an ordinal position of the icon that is displayed on the sound output device; and
  controlling a display screen of the information-sharing device to display the selected icon.

* * * * *